July 26, 1960 W. J. GILBERT, SR 2,946,608
CONTINUOUSLY WASHED SHAFT SEAL
Filed Oct. 27, 1955

INVENTOR.
WALTER J. GILBERT, SR.
BY
William J. Carothers
HIS ATTORNEY

United States Patent Office 2,946,608
Patented July 26, 1960

2,946,608

CONTINUOUSLY WASHED SHAFT SEAL

Walter J. Gilbert, Sr., Indiana, Pa., assignor to Syntron Company, Homer City, Pa., a corporation of Delaware Filed Oct. 27, 1955, Ser. No. 543,231

8 Claims. (Cl. 286—8)

This invention relates generally to shaft seals and more particularly to seals for the propeller shafts of ships.

Propeller shaft seals have long life when in clean sea water. The structure of most seals permit some sea water to leak to the bilge. If this water is clean the seal is not damaged. If it has mud in suspension the seals quickly wear. Thus ships in rivers and bays and at port have difficulty in holding their seals and require frequent attention in replacing the seal or otherwise repairing the same. Large seagoing ships have considerably more difficulty as some types of seals they employ require the ship to be placed in dry dock to repack the same. This is a costly procedure.

This problem is solved by continuously supplying a propeller shaft seal with a clean fresh liquid which washes past the sealing face and out with the shaft against the pressure of the sea to prevent the ingress of any abrasive particles in suspension from the sea. The shaft passes through a housing secured to the hull of the ship and is open to the sea with limited clearance around the shaft. This clearance together with the sealing surfaces and the pressure of the sea water functions with the pressure on the washing or lubricating liquid as a directional flow control across the radial sealing surfaces to determine the radial direction that predetermined amounts of liquid will flow.

By having one flat annular sealing surface, which is preferably metal and can seal the end of the sealing chamber in the housing, and a mating sealing surface formed on the elastomer sealed with the shaft, a clean liquid such as water can be supplied under pressure to a point intermediate the radial extent of these sealing surfaces. The restricted flow from the chamber to the sea together with the pressure of the sea water and the centrifugal pump action of the rotating seal are all factors that determine the amount of liquid flowing past the sealing surfaces to the bilge and the amount flowing to the sealing chamber. With a constant speed of rotation of the shaft it requires an increased pressure on the washing liquid supplied to induce more flow of this liquid to the bilge. This pressure may be further increased by placing the washing liquid inlet to the sealing surfaces closer to the periphery than to the axis. Thus the greatest sealing area is inward of the supply of the washing liquid. The greater the pressure required to induce flow of the washing liquid across this wider sealing surface to the bilge the better the control of the flow and the seal conditions. Thus one can permit only a small seepage across the greater sealing surface and collect it in a pan while the major portion is flowing out past the shaft to the sea and preventing the silt in suspension from entering into the sealing chamber.

To insure annular distribution of the washing liquid an annular channel can be made in either of the sealing faces. This annular channel being opposite to the liquid supply passage thus defines the outer and the inner radial annular sealing surfaces. The outer annular radial sealing surfaces pass the washing liquid to the sealing chamber and thence past the shaft clearance to the sea. The inner annular radial sealing surfaces pass the washing liquid to the bilge. The flow factors of these cooperative elements and the pressures determine the amount of washing liquid flowing each way, but where the flow is maintained the seal is kept clean and will last a long time. Usually the outer annular sealing surface is smaller than the inner annular sealing surface and it has less mechanical pressure applied to it than the inner sealing surface.

The clearance flow around the shaft from the sealing chamber to the sea may be controlled by the standby seal which is an inflatable annular seal that is normally brought into use to seal by inflation of an elastomer member around the shaft when the seal chamber is opened to replace the principal seal member. This inflatable seal can be partially inflated to create a greater resistance to flow around the shaft to the sea. Thus another variable factor may be supplied by varying the inflation of the standby seal.

Other objects and advantages appear hereinafter in the following description and claims.

The accompanying drawings show for the purpose of exemplification without limiting the invention or claims thereto certain practical embodiments of the invention wherein:

Figure 2:
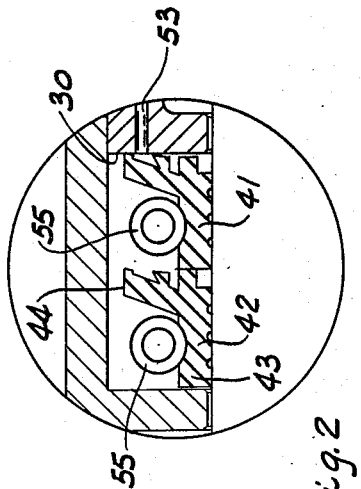
Fig. 2 is an enlarged sectional view of the seal structure shown in Fig. 1.
Figure 4:
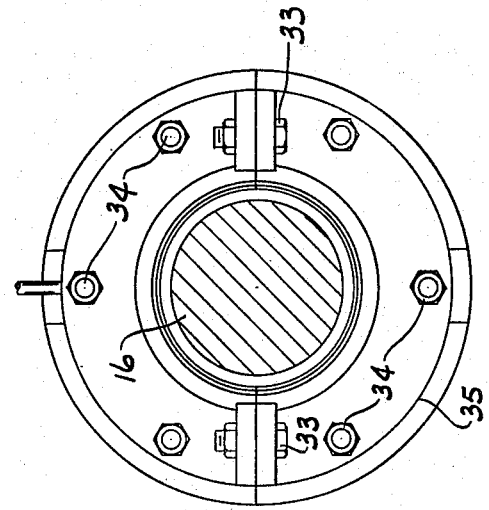
Fig. 4 is a view of the right end of the structure shown in Fig. 1.

Referring to the drawings, the split housing 1 is made in upper and lower halves 2, 2a and 3, 3a being split along the vertical plane and having the flanges 4 and 4a and split along the horizontal plane and having the radial flanges 5 and 5a which when bolted together form the completed housing.

Figure 1:
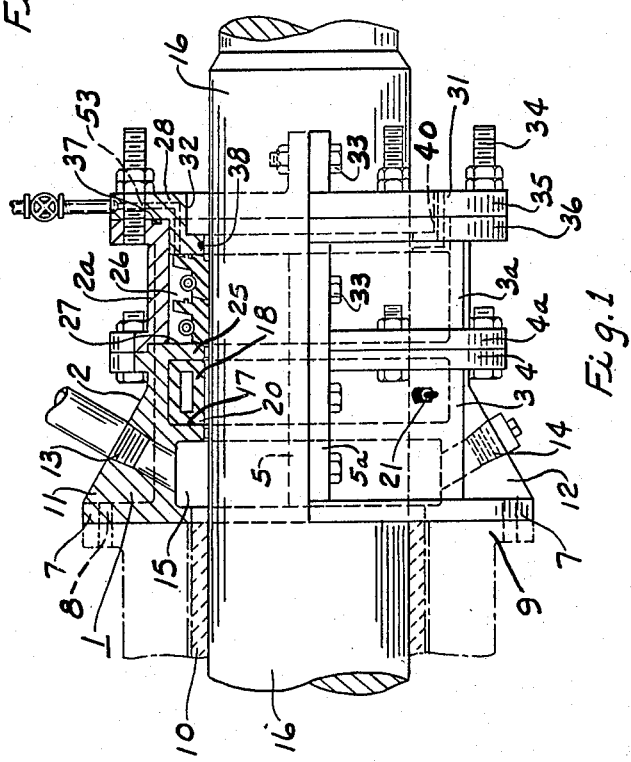
Fig. 1 is a sectional view showing the seal comprising this invention as applied to a propeller shaft of a ship.

The end of the housing is provided with the flange halves 7 which form an annular flange having a series of holes 8 passing therethrough for securing the housing to the hull of a ship or to the end of the housing 9, enclosing the tail shaft bearing 10 as shown in Fig. 1. The flange 7 is backed up by the upper and lower angular brace members 11 and 12 which are each provided with threaded openings 13 and 14 that open into the interior chamber 15 of the split housing that surrounds the propeller shaft 16. The upper threaded opening 13 is supplied with clean sea water under pressure for lubricating the tail shaft bearing 10 that produces positive and continued flow out through the tail shaft bearing and the stern tube of the ship. This functions to keep the bearing clean. Fresh water or water having been treated to remove any foreign substances or suspended substances in this tail bearing sea water provides longer life for the bearing and shaft. The lower opening 14 is used as a drain or blowout for the chamber 15.

The halves of the split housing 1 form an annular recess 17 for receiving the inflatable sealing member 18 which is made in two halves 20 and which are entirely independent of each other. Each expandable seal half has two valve stem mounting members 21, the stems of which support these seals in their respective housing half and maintain spaced relation between their inner arcuate surfaces and the shaft.

Each standby seal section is hollow for receiving fluid under pressure, such as water, oil, gas or air that may be inserted through one of the valve stems 21 to expand the seal members into sealing relation with the sides of the recess 17 and with each other and with the shaft 16, When this seal is expanded by inflation against the shaft and housing the shaft has to rotate in contact with the seal. By supplying a light pressure on the shaft and permitting a flow of clean liquid between the seal and the shaft, the same may be lubricated and will last for a long period of time, enough to bring a ship back to port.

The partition wall 25 separates the expandable seal recess 17 from the seal chamber 26 which is open to the end of the split housing 1. The face 27 on the wall 25 forms on end of the chamber 26. The split gland member 28 closes the other end of the chamber and provides the annular sealing surface 30. The split gland member 28 is made up of two sections 31 and 32 bolted together by the bolts 33 and to the housing by the bolts 34. The gland member is provided with the outwardly extending radial flange 35 which mates with the flange 36 on the housing to which the stud bolts 34 are secured. An annular flange seal 37 is inserted between the flanges 35 and 36.

An annular groove 38 is placed in the bore of the gland member 27 to receive and direct any liquid through the passage 40 to the exterior of the split gland member where the liquid may be caught in a container or go to the bilge.

The annular seal members 41 and 42 are duplicates. The one to the left, seal 42, is a standby seal which can be changed when the seal 41 requires replacing. Each seal member is provided with a body section 43 that has one outwardly projecting flange 44, the outer face 45 of the seal 41 forms the mating sealing surface for annular sealing surface 30.

The sealing face 45 of each elastomer sealing surface is provided with two annular grooves 46 and 47 dividing the sealing surface into three annular surfaces or lands 48, 50, and 51. The inner surface 48 forms an abutment to engage the sealing surface 30 if in the position of seal 41 or the next adjacent seal in the position of seal 42.

Figure 3:
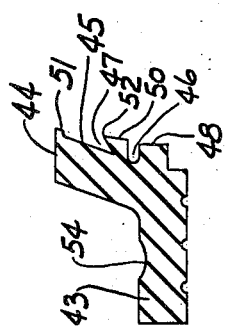
Fig. 3 is an enlarged view of the sealing element as a free body.

The abutment surface 48 is inward of the sealing surfaces 50 and 51 because the flange 44 normally extends laterally outward as shown in Fig. 3 when a free body.

The main sealing surface is the land 50 which is wider than the land 51. The land 50 has a turned-up edge or lip 52 which aids to seal this surface. Any pressure in the groove 46 is effective on this lip to seal the same. However, increased pressure in the annular groove will increase the flow past the smaller land 51 until the resistance to flow in that direction is greater than that past the surface 50, in which case some liquid flows radially in both directions.

Liquid is supplied to the groove 47 by the passage 53 which is connected to any suitable source of liquid, the pressure of which may be varied.

The elastomer sealing elements 41 and 42 each have a shallow groove 54 in the perimetral surface of the body thereof to receive the garter springs 55. These garter springs tightly hold the sealing elements on the shaft causing them to rotate with the shaft. The pressure exerted on the flexible sealing elements by the garter springs is sufficient to prevent leakage along the shaft surface.

These sealing elements 41 and 42 are free to slide axially on the shaft without loss of contact with the sealing surface on the gland ring as the propeller shaft moves axially from a full forward to a full reverse thrust.

The flexible flange 44 has the two annular sealing surfaces engaging the annular polished sealing surface 30, the inner sealing surface 50 and the outer sealing surface 51. The abutment surface 48 is normally out of contact as it is indented and only acts as a thrust shouldre that limits the permissible axial movement of the seal member on the shaft. Clean water is supplied under pressure through the passage 53 to the groove 47 from whence it flows radially outwardly or radially in both directions. This clean water is the same or slightly greater in pressure than that in the chamber 26 which is filled and escapes through the bearing 10 and the stern tube.

This flushing of the sealing surfaces produces a hydraulic balancing sysem creating flow and at the same time cools and provides lubrication to the contacting surfaces of the elastomer. The liquid is in effect the seal and separator between the contacting surfaces which extend their life. The volume of liquid required to perform this function is small as compared to that employed to flush and lubricate the tail bearing. However, this slight flow acts as a flusing action to prevent the entry of any abrasive material into the actual sealing areas.

The wide radial face of this sealing surface permits lateral movement of the shaft due to bearing wear without loss of the seal.

The water introduced into the opening 13 to lubricate and flush the tail bearing may be supplied from the chamber 26 until the tail bearing becomes worn and a greater volume is required to be fed directly through the opening 13.

The aft sealing element 42 is provided as a spacer sealing ring to properly locate the forward sealing ring 41. The ring 42 is thus a spare part and is at hand at all times.

Figure 5:
Fig. 5 is an enlarged view of a barb to hold the ends of the elastomer together.

The elastomers 41 and 42 are cut radially so that they can be placed over the shaft. After the seal is in place its ends are held together by the barbed staple shown in Fig. 5. Each end is barbed and driven into the adjacent ends of the elastomer. This staple can be placed in the flange 44 or the body. It is preferable to put it in the flange to keep the sealing surfaces flush at the cut joint.

I claim:

1. A ship's propeller shaft seal comprising a propeller shaft, a housing surrounding said propeller shaft and sealed with the hull of the ship, radial walls defining the ends of an annular chamber in said housing, a seal including a body mounted in annular sealed relation on said shaft, a yieldable annular flange on said body having a radial sealing face continuously engaging the face of one of said radial walls defining the ends of said annular chamber, a passage in said one wall opening through said radial sealing face intermediate the extent of the radial contact of said flange to supply clean liquid under pressure to flow in both directions along said shaft and wash down said shaft and through the hull to the sea to prevent the ingress of sea water, said sealing flange has an intermediate annular groove opposite to said passage and defining inner and outer sealing lands, and said inner land produced by said annular groove is broader than the outer land requiring a higher pressure on the clean liquid to increase the washing leakage across the broad inner land to the bilge.

2. The structure of claim 1 characterized in that said groove undercuts said broader land to increase the sealing pressure thereon.

3. A ship's propeller shaft seal comprising a propeller shaft, a housing surrounding said propeller shaft and sealed with the hull of the ship, radial walls defining the ends of an annular chamber in said housing, a seal including a body mounted in annular sealed relation on said shaft, a yieldable annular flange on said body having a radial sealing face continuously engaging the face of one of said radial walls defining the ends of said annular chamber, a passage in said one wall opening through said radial sealing face intermediate the extent of the radial contact of said flange to supply clean liquid under pressure to flow in both directions along said shaft and wash down said shaft and through the hull to the sea to prevent the ingress of sea water, said sealing flange has an intermediate annular groove opposite to said passage and defining inner and outer sealing lands, and said body has an abutment to engage said one wall having the sealing face to limit the flexing of said yieldable annular flange.

4. A propeller shaft seal comprising a housing having an annular seal chamber open at its inner end, a rotary propeller shaft extending through said seal chamber and through the outer end of said housing to the sea which has access around said shaft to said chamber, gland means engaging the inner end of said housing and closing the annular open end of said chamber around said shaft, an annular stationary sealing face on the end of said gland exposed in said chamber around said shaft in said seal chamber, an annular elastomer clamped in sealed relation on said shaft, an annular yieldable flange on said elastomer having an outward extending annular elastomer sealing face continuously held in mating engagement with said stationary annular sealing face on said gland means, an annular groove in said elastomer sealing face defined by inner and outer annular lands, a liquid supply passage in said gland means and extending through said annular stationary sealing face into said chamber at the position of said annular groove in said rotary elastomer sealing face, liquid carried through said passage to said sealing faces and flowing radially in both directions between said annular lands on said rotary sealing face and stationary sealing face as their continuous contact and relative rotation subsists, the liquid flowing from under the outer land passing through said seal chamber and along said shaft to the sea to block the ingress of sea water to said sealing chamber.

5. The structure of claim 4 characterized in that the sealing face of said inner land is materially wider than the sealing face of said outer land.

6. The structure of claim 4 which also includes means to change the pressure on the fluid delivered to said passage to control that portion of the amount of liquid flowing out around the shaft to sea and that portion flowing inboard.

7. A propeller shaft seal comprising a housing having an annular seal chamber open at its inner end, a rotary propeller shaft extending through said seal chamber and through the outer end of said housing and through an outboard bearing to the sea which has access around said shaft to said chamber, expansible seal means for said shaft outboard of said chamber, gland means engaging the inner end of said housing and closing the annular open end of said chamber around said shaft, an annular radially disposed stationary sealing face on the end of said gland exposed in said chamber around said shaft, an annular elastomer clamped in sealed relation on said shaft in said seal chamber, an annular yieldable flange on said elastomer having an outward radially extending annular elastomer sealing face continuously held in mating engagement with said radially disposed stationary annular sealing face on said gland means, an annular groove in said elastomer sealing face defined by inner and outer annular lands, a liquid supply passage in said gland means and extending through said annular radially disposed stationary sealing face into said chamber at the position of said annular groove in said elastomer sealing face, liquid carried through said passage in said annular radially disposed stationary sealing face on said gland means to said sealing faces on the flange of said elastomer and flowing radially in both directions between said rotary and stationary sealing faces as their continuous contact and relative rotation subsists, the liquid flowing through said seal chamber and along said shaft to the sea to block the ingress of sea water to said sealing chamber when said expansible seal means is contracted from said shaft.

8. A propeller shaft seal comprising a housing having an annular seal chamber open at its inner end, a rotary propeller shaft extending through said seal chamber and through the outer end of said housing through an outboard bearing to the sea which has access around said shaft to said chamber, expansible seal means for said shaft outboard of said chamber, gland means engaging the inner end of said housing and closing the annular open end of said chamber around said shaft, an annular stationary sealing face on the end of said gland exposed in said chamber around said shaft, an annular elastomer clamped in sealed relation on said shaft in said seal chamber, an annular yieldable flange on said elastomer having an outward radially extending annular elastomer sealing face continuously held in mating engagement with said stationary annular sealing face on said gland means, an annular groove in said elastomer sealing face defined by inner and outer annular lands, a liquid supply passage in said gland means and extending through said annular stationary sealing face into said chamber at the position of said annular groove in said elastomer sealing face, liquid carried through said passage to said sealing faces and flowing radially in both directions between said rotary and stationary sealing faces as their continuous contact and relative rotation subsists, the liquid flowing through said seal chamber and along said shaft to the sea to block the ingress of sea water to said sealing chamber when said expansible seal means is contracted from said shaft, a clear water inlet to said housing positioned outboard of said expansible seal.

References Cited in the file of this patent

UNITED STATES PATENTS

| | | |
|---|---|---|
| 47,329 | Pelton | Apr. 18, 1865 |
| 331,293 | Gingras | Dec. 1, 1885 |
| 1,843,122 | Carrier | Feb. 2, 1932 |
| 2,133,487 | Spargo | Oct. 18, 1938 |
| 2,300,385 | Kollberg | Oct. 27, 1942 |
| 2,547,185 | Von Bolhar | Apr. 3, 1951 |
| 2,736,265 | Higgins | Feb. 28, 1956 |
| 2,761,709 | Gilbert | Sept. 4, 1956 |
| 2,864,631 | Kemp | Dec. 16, 1958 |

FOREIGN PATENTS

| | | |
|---|---|---|
| 24,955 | Great Britain | Nov. 6, 1906 |